United States Patent [19]
Yokota et al.

[11] Patent Number: 5,174,338
[45] Date of Patent: Dec. 29, 1992

[54] PRESSURE CONTROL VALVE UNIT

[75] Inventors: Tadaharu Yokota; Koichi Komatsu, both of Kanagawa, Japan

[73] Assignee: Atsugi Motor Parts Company, Limited, Kanagawa, Japan

[21] Appl. No.: 682,442

[22] Filed: Apr. 8, 1991

Related U.S. Application Data

[63] Continuation of Ser. No. 357,001, May 25, 1989, abandoned.

[30] Foreign Application Priority Data

May 25, 1988 [JP] Japan .................... 63-69170

[51] Int. Cl.⁵ .................... F15B 13/043; F15B 13/044
[52] U.S. Cl. .................... 137/625.64; 137/625.65
[58] Field of Search .................... 137/625.64, 625.65

[56] References Cited

U.S. PATENT DOCUMENTS

| | | | |
|---|---|---|---|
| 3,856,047 | 12/1974 | Tarayama | 137/625.64 X |
| 4,119,294 | 10/1978 | Schnorrenberg | 137/505.18 X |
| 4,316,599 | 2/1982 | Bouvet et al. | 137/625.65 X |
| 4,321,941 | 3/1982 | Hunschede et al. | 137/625.64 X |
| 4,491,153 | 1/1985 | Bartholomaus | 137/625.65 |
| 4,875,501 | 10/1989 | Ichihashi et al. | 137/625.64 |
| 5,042,832 | 8/1991 | Takahashi et al. | 137/625.64 X |

FOREIGN PATENT DOCUMENTS

| | | | |
|---|---|---|---|
| 156784 | 9/1983 | Japan . | |
| 208911 | 8/1988 | Japan | 137/625.65 |
| 1-199081 | 8/1989 | Japan | 137/625.64 |
| 2102158 | 1/1983 | United Kingdom | 137/625.65 |

Primary Examiner—Gerald A. Michalsky
Attorney, Agent, or Firm—Bachman & LaPointe

[57] ABSTRACT

A pressure control valve unit includes a valve housing formed with a valve bore. The valve housing is also formed with an inlet port, a drain port and a control port. A valve spool is disposed in the valve bore for selectively establishing fluid communication between the control port and the inlet port, and between the control port and the drain port. The drain port is connected to a first drain path which selectively establishes and blocks fluid communication between the drain port and a working fluid source and to a second drain path which normally connect the drain port to the working fluid source. A flow restricting orifice is provided in the second drain path for constantly permitting limited flow rate of the working fluid from the drain port and the working fluid source. The flow restricting orifice generates damping force for damping surge pressure.

11 Claims, 2 Drawing Sheets

PRESSURE CONTROL VALVE UNIT

This is a continuation of application Ser. No. 357,001 filed May 25, 1989, now abandoned.

BACKGROUND OF THE INVENTION

1. Field of the Invention

The present invention relates generally to a pressure control valve unit. More specifically, the invention relates to a electromagnetic proportioning valve unit which is suitable for use in attitude change suppressive suspension control to be performed in suspension control system, such as active suspension control and so forth.

2. Description of the Background Art

In the recent years, advanced technologies have been developed in automotive suspension systems for achieving both of high level riding comfort and driving stability. In one of such advanced automotive suspension technologies, an active suspension control has been known as one of the most advanced technology in controlling vehicular attitude. Generally, typical construction of active suspension control system includes a hydraulic cylinder disposed between a vehicle body and a suspension member which rotatably supports a road wheel, and defines a working chamber. The working chamber of the hydraulic cylinder is connected to a pressurized fluid source, such as an engine driven fluid pump. A pressure control valve is disposed within a hydraulic circuit connecting the fluid source and the working chamber so as to control the working fluid pressure in the working chamber so as to perform active suspension control for suppressing vehicular attitude change for better riding comfort and higher driving stability. One of typical construction of actively controlled suspension system has been disclosed in the U.S. Pat. No. 4,702,490, issued on Oct. 27, 1987. In addition, Japanese Patent First (unexamined) publication (Tokkai) Showa 58-156784 discloses a pressure control valve applicable for such actively controlled suspension system. The disclosed pressure control valve in the Japanese Publication has a valve housing in which is defined a pressure control chamber disposed therein a main valve spool and a pilot chamber disposed therein a pilot valve spool are housed. The pilot valve is associated with an electromagnetic actuator, such as a solenoid. The pilot valve is operated by the electromagnetic actuator for generating a pilot pressure in the pilot chamber for controlling the main valve spool position for controlling supplying and draining the working fluid pressure in the working chamber.

The valve housing is formed with a main inlet port communicating with a pressure control chamber which is, in turn, communicated with the working chamber of the hydraulic cylinder and a pilot inlet chamber. Also, the valve housing is also formed with a main drain port and a pilot drain port connected to the fluid source for returning the working fluid to the fluid source. The main and pilot inlet ports are commonly connected to a common supply line, and the main and pilot drain ports are connected to a common drain line. Since the main valve spool is placed for blocking the main inlet port when the fluid force in the pilot chamber and the fluid force of the working chamber exerted on the main valve spool. The pilot valve spool blocks the pilot inlet port when the fluid pressure in the working chamber reaches a target pressure.

By connecting the main and pilot drain ports to the fluid source via the common drain line, relatively large amount of working fluid flowing through the drain line from the working chamber when the pressure in the working chamber is to be reduced can affect to the pilot pressure by generating a surge pressure to be introduced into the pilot chamber via the pilot drain port via the drain line. Namely, when such surge pressure in the drain line is introduced into the pilot pressure, pressure balance is destroyed for causing fluctuation of the working fluid pressure in the working chamber. This fluctuation of the pressure in the working chamber can cause generation of the vibration and noise in the hydraulic cylinder.

SUMMARY OF THE INVENTION

Therefore, it is an object of the present invention to provide a pressure control valve which can avoid influence of the surge pressure and thus enables stable suspension control.

Another object of the invention is to provide a pressure control valve, which can successfully damp the surge pressure.

In order to accomplish aforementioned and other objects, a pressure control valve unit, according to the present invention, includes a valve housing formed with a valve bore. The valve housing is also formed with an inlet port, a drain port and a control port. A valve spool is disposed in the valve bore for selectively establishing fluid communication between the control port and the inlet port, and between the control port and the drain port. The drain port is connected to a first drain path which selectively establishes and blocks fluid communication between the drain port and a working fluid source and to a second drain path which normally connect the drain port to the working fluid source. A flow restricting orifice is provided in the second drain path for constantly permitting limited flow rate of the working fluid from the drain port and the working fluid source. The flow restricting orifice generates damping force for damping surge pressure.

According to one aspect of the invention, a pressure control valve comprises:

a valve housing defining a valve bore, an inlet port connected to a pressurized fluid source, a drain port connected to the fluid source for returning the working fluid, and a control port connected to a work for controlling the fluid pressure in the work;

a valve spool movable between a first position and a second position across a predetermined neutral position, the valve spool defining a feedback chamber constantly communicated with the work and being in communication with the drain port when fluid communication between the control port and the drain port is established;

a first fluid passage means for establishing fluid communication between the inlet port and the control port for feeding pressurized fluid and between the control port when the valve spool is in the first position;

a second fluid passage means for establishing fluid communication between the control port and the drain port for draining the fluid pressure in the work when the valve spool is in the second position; and a flow restriction means associated with the second fluid passage means, for damping surge pressure created in the second fluid passage means.

The pressure control valve further comprises an electromagnetic actuator for driving the valve spool between the first and second positions for adjusting fluid pressure in the work. The valve spool defines a first and second chambers opposing both ends of the valve spool for exerting force on both axial ends of the valve spool for determining the position of the valve spool for force balance therebetween. The pressure control valve further comprises a secondary valve bore defined in the valve housing, a secondary valve spool defining a chamber communicated with the first chamber for feeding a pilot pressure to the latter for determining the position of the valve spool depending upon the force balance between the first chamber and the second chamber to which the fluid pressure in the work is introduced.

According to another aspect of the invention, a pressure control valve for controlling fluid pressure in a working chamber of a hydraulic cylinder of an automotive suspension system, comprises:

a valve housing defining a valve bore, an inlet port connected to a pressurized fluid source, a drain port connected to the fluid source for returning the working fluid, and a control port connected to a working chamber for controlling the fluid pressure in the working chamber;

a valve spool movable between a first position and a second position across a predetermined neutral position, the valve spool defining a feedback chamber constantly communicated with the working chamber and being in communication with the drain port when fluid communication between the control port and the drain port is established;

a first fluid passage means for establishing fluid communication between the inlet port and the control port for feeding pressurized fluid and between the control port when the valve spool is in the first position;

a second fluid passage means for establishing fluid communication between the control port and the drain port for draining the fluid pressure in the working chamber when the valve spool is in the second position; and a flow restriction means associated with the second fluid passage means, for damping surge pressure created in the second fluid passage means.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
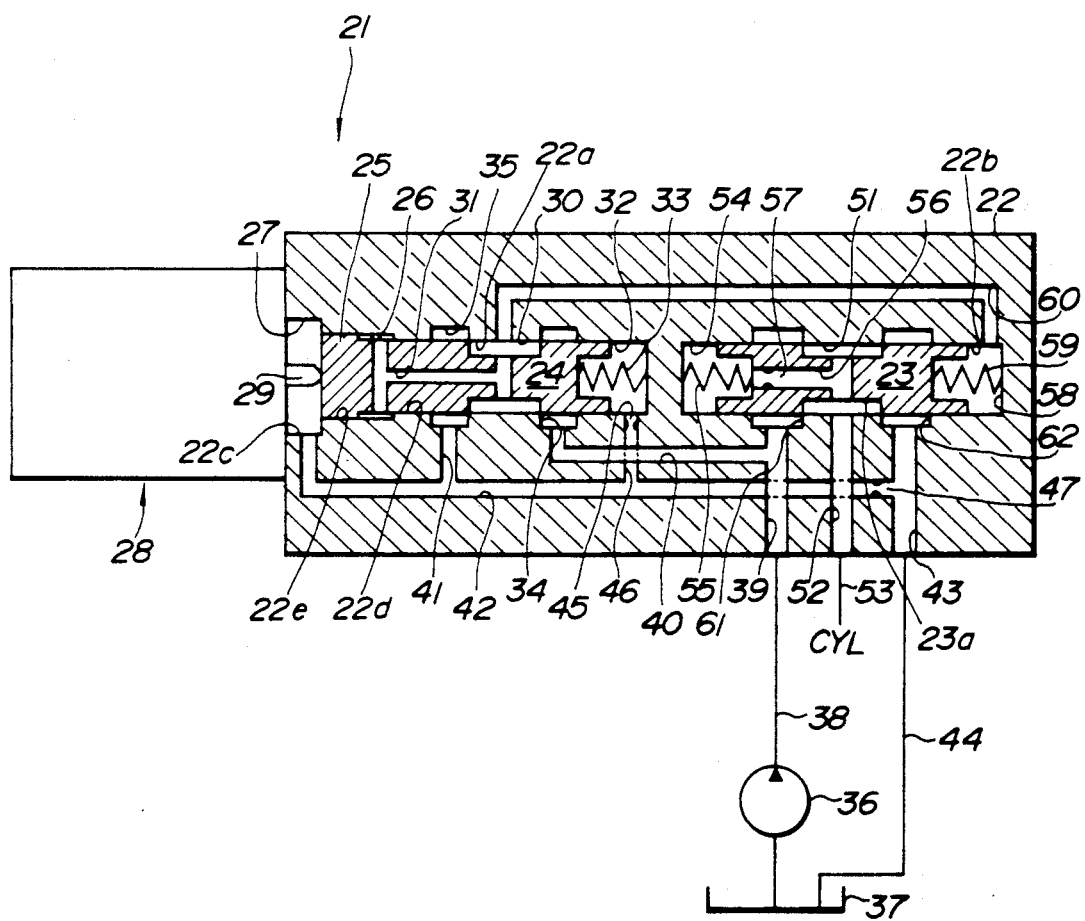
FIG. 1 is a sectional view of the preferred embodiment of a pressure control valve assembly according to the present invention.

Referring now to the drawings, particularly to FIG. 1, the preferred embodiment of a pressure control valve assembly 21 includes a valve housing 22 which defines an one end opened bore 22a and a blind bore 22b. The bores 22a and 22b are arranged in axial alignment to each other. The bore 22a includes a first bore section 22c which has the largest diameter, a second bore section 22d having the smallest diameter, and a third bore section 22e having intermediate diameter between the first and second bore sections and oriented between the first and second bore sections. Annular grooves 34 and 35 are formed on the inner periphery of the bore 22a and open toward the second bore section 22d. Similarly, annular grooves 61 and 62 are formed on the inner periphery of the bore 22b, which grooves are open toward the associated bore 22.

A main valve spool 23 is disposed within the bore 22b for thrusting movement therein. An annular groove 23a is formed on the outer periphery and extends in circumferential direction. The main valve spool 23 defines a pressure control chamber 54 and a pilot chamber 58. The main valve spool 23 also defines an annular chamber 51 between the periphery of the annular groove 23a and the inner periphery of the bore 22b. The pressure control chamber 54 is communicated with the annular chamber 51 via an internal path 56 with a flow restriction orifice 57 formed in the main valve spool. Mechanical springs 55 and 59 are respectively disposed within the pressure control chamber 54 and the pilot chamber 58 for exerting biasing force to the main valve spool 23. The spring forces of the springs 55 and 59 are so selected as to balance at a main valve spool position, at which the annular chamber 51 are oriented intermediate position between the annular grooves 61 and 62 and thus blocked from fluid communication with either annular grooves, while the fluid force to be exerted by the fluid pressures in the pressure control chamber 54 and the pilot chamber 58. This position of the main valve spool 23 will be hereafter referred to as "neutral position".

An inlet port 39, a drain port 43 and a control port 52 are formed through the valve housing 22. The inlet port 39 is communicated with the annular groove 61. The drain port 43 is communicated with the annular groove 62. On the other hand, the control port 52 is oriented at a position where fluid communication is constantly established with the annular chamber 51. The inlet port 39 is, in turn, connected to a fluid pump 36 which is associated with an automotive engine to be driven by the output thereof. The fluid pump 36 sucks a working fluid in a fluid reservoir 37 via a suction line 37a and feeds to the inlet port 39 via a supply line 38. On the other hand, the drain port 43 is connected to the fluid reservoir 37 via a drain line 44 for returning the working fluid thereto. On the other hand, the control port 52 is communicated with a working chamber of a hydraulic cylinder (not shown) via a control line 53. As will be appreciated, the hydraulic cylinder is disposed between a vehicular body and a suspension member rotatably supporting a vehicular wheel for absorbing vibration energy to be transferred between the vehicular body and the vehicular wheel. For example, such type of automotive suspension system has been disclosed in the U.S. Pat. No. 4,702,490, issued on Oct. 27, 1987. The disclosure in the above-identified U.S. patent in terms of the construction of the hydraulic cylinder, the arrangement thereof and operation thereof is herein incorporated by reference for the sake of disclosure.

A pilot valve spool 24 is thrustingly disposed within the bore 22a for thrusting movement along the axis thereof. The pilot valve spool 24 has an annular bulge 25 at the end portion opposing the first bore section 22c. The annular bulge 25 is cooperative with the inner periphery of the third bore section 22e for defining therebetween an annular feedback chamber 26. The pilot valve spool 24 defines an annular chamber 30 which extends in circumferential direction on the outer periphery thereof. The annular chamber 30 is in fluid communication with the feedback chamber 26 via an internal path 31 defined through the pilot valve spool 24.

The first bore section 22c opens at one axial end of the valve housing 22. The opening end of the first bore section 22c is closed by an actuator housing 28a which houses an electromagnetic solenoid (not shown) associated with a plunger rod 29. The plunger rod 29 is also biased by means of a bias spring with a predetermined spring force. The actuator housing 28a, the solenoid, the plunger rod 29 and the bias spring forms an actuator assembly 28.

The actuator assembly is cooperative with the first bore section 22c to define a low pressure chamber 27 which opposes the axial end of the pilot valve spool 24. The plunger rod 29 extends through the low pressure chamber 27 to resiliently and constantly contact with the axial end of the pilot valve spool 24. The pilot valve spool 24 also defines a low pressure chamber 32 at the other axial end of the pilot valve spool at the side remote from the low pressure chamber 27. A mechanical spring 33, such as a coil spring, is disposed in the low pressure chamber 32 for exerting spring force toward the actuator. In condition where the solenoid is not energized, the spring force of the mechanical spring 33 and the spring force exerted though the plunger rod 29 balance at a position of the pilot valve spool 24, at which the annular chamber 30 is oriented between the annular grooves 34 and 35 and thus is blocked from fluid communication with either annular groove. This position of the pilot valve spool 23 will be hereafter referred to as "neutral position".

As can be seen from FIG. 1, the low pressure chambers 27 and 33 are connected to the drain port 43 via a drain path 42. A flow restriction orifice 45 is provided between the low pressure chamber 32 and the drain path 42 in order to restrict fluid flow therethrough. Similarly, a flow restriction orifice 47 is provided in the drain path 42 for providing flow restriction for the fluid flow flowing therethrough. The annular groove 35 is also connected to the drain path 42 via a branch path 41. On the other hand, the annular groove 34 is in fluid communication with the inlet port 39 via a supply path 40. The annular chamber 30 is connected to the pilot chamber 58 via a pilot path 60.

When the solenoid is energized to cause shifting of the plunger rod 29 toward right in FIG. 1, the force balance between the forces exerted on both axial ends of the pilot valve spool 24 is broken to overcome the spring force of the spring 33 to permit shifting of the pilot valve spool 24 toward right. As a result, fluid communication between the annular chamber 30 and the inlet port 39 via the supply path 40 and the annular groove 34 is established for introducing the pressurized fluid into the annular chamber 30. Therefore, the fluid pressure in the annular chamber 30 is thus increased. Since the annular chamber 30 is communicated with the feedback chamber 26 via the internal path 31 and with the pilot chamber 58, the fluid pressure in both of the feedback chamber 26 and the pilot chamber 58 is also increased. Therefore, the force balance at both axial ends of the main valve spool 23 is broken to cause shifting of the main valve spool toward left in FIG. 1 against the spring force of the spring 55 to establish fluid communication between the annular chamber 51 and the annular groove 61. As a result, the pressurized fluid introduced through the inlet port 39 flows through the annular groove 61, the annular chamber 51, the control port 52 and the control line 53 to the working chamber of the hydraulic cylinder for increasing the fluid pressure therein.

During the operation set forth above for increasing the fluid pressure in the working chamber of the hydraulic cylinder, assuming the effective area of the feedback chamber 26 is A, the force Fs to the exerted onto the pilot valve spool 24 via the plunger rod 29 can be illustrated by:

$$Fs = A \times P_F + kx$$

where
$P_F$ is a fluid pressure in the feedback chamber 26; and
kx is spring force of the spring 33.

When the foregoing equation is established, the force to be exerted on the pilot valve spool is balanced for maintaining the pilot valve spool at the neutral position. The force Fs to be exerted on the pilot valve spool 24 via the plunger rod 29 is proportional to electric current i applied to the solenoid. Therefore, the fluid pressure $P_p$ to be established in the pilot chamber 58 is proportional to the electric current i applied to the solenoid. While the main valve spool 23 is placed at shifted position overcoming the force of the working fluid in the control chamber 54 and the spring 55, the fluid pressure in the working chamber of the hydraulic cylinder is increased. By increasing the fluid pressure in the working chamber, the force in the control chamber is also increased to return the main valve spool 23 toward the neutral position. The main valve spool 23 is finally positioned at the neutral position when the balance of the force exerted on both axial ends is established.

On the other hand, when the electric current i is reduced for decreasing the force Fs to be exerted on the pilot valve spool 24 via the plunger rod 29, the balance of force at both axial ends of the pilot valve spool 24 is destroyed to cause axial shifting of the pilot valve spool toward left. As a result, the annular chamber 30 is communicated with the annular groove 35. Therefore, the annular chamber 30 is connected to the fluid reservoir 37 via the drain port 43 and the drain line 44. As a result, the fluid pressure in the annular chamber 30 is decreased. Accordingly, the fluid pressure in the pilot chamber 58 which is in communication with the annular chamber 30, is also decreased. By lowering of the pressure in the pilot chamber 58, the balance of the force between both axial ends of the main valve spool 23 is destroyed. Therefore, the main valve spool 23 is shifted toward right in FIG. 1 to establish fluid communication between the annular chamber 51 and the annular groove 62. Therefore, the fluid pressure in the working chamber of the hydraulic cylinder is drained through the control line 53, the control port 52, the annular chamber 51, the annular groove 62, the drain port 43 and the drain line 44. According to reduction of the fluid pressure in the control chamber 55 according to reduction of the fluid pressure in the working chamber, the main valve spool 23 is gradually shifted right toward the neutral position. The main valve spool 23 is finally positioned at the neutral position when the force balance at both axial ends thereof is again established.

During pressure relieving operation due to reduction of the electric current applied to the solenoid, the pressurized fluid is fed to the drain port 43 via the annular groove 62 and via the annular groove 35. In the normal operation, the fluid pressure in the working chamber of the hydraulic cylinder is maintained at substantially high pressure level, e.g. 30 kg/cm². When the pilot valve spool 24 is shifted toward left and the main valve spool 23 is shifted toward right for reducing the fluid pressure in the working chamber, such high pressure fluid flows through the drain port 43. Therefore, the substantial amount of working fluid flows from the working chamber to cause rising of the fluid pressure in the drain port. When the fluid pressure in the drain port 43 becomes greater than the fluid pressure in the paths 41 and 42, the surge pressure $P_0$ is introduced into the feedback chamber 26 via the annular chamber 30. This causes temporary increasing of the fluid pressure in the feedback chamber 26.

In the shown construction of the pressure control valve set forth above, the orifice 47 provided in the path 42 in the vicinity of the end communicating with the drain port 43, provides flow restriction for the surge flow of the working fluid. This flow restriction serves for successfully damping the surge pressure to be introduced into the path 42. Therefore, the pressure in the feedback chamber 26 can be successfully avoided.

As will be appreciated, since the shown embodiment can avoid influence of the surge pressure be providing the orifice, the working fluid flow rate in the drain port can be set at greater value for permitting quicker reduction of the working fluid pressure. This is substantially advantageous for providing higher response ability in control of suspension characteristics.

Figure 2:
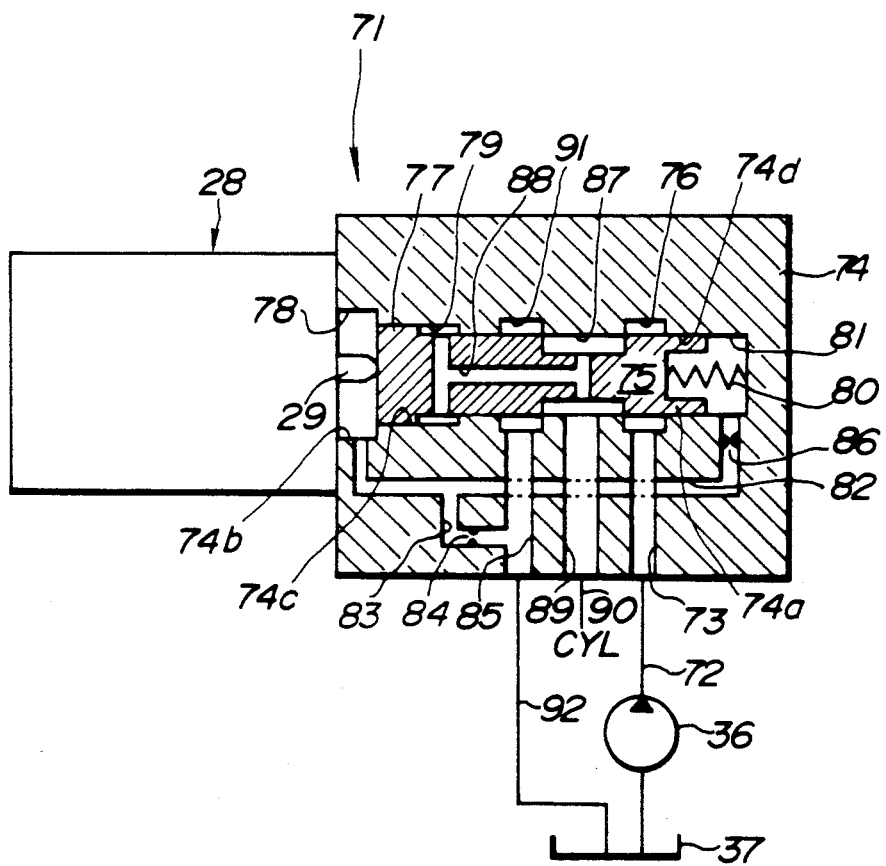
FIG. 2 is a sectional view of another embodiment of a pressure control valve assembly according to the present invention.

FIG. 2 is a section of another embodiment of the pressure control valve assembly according to the present invention. As will be appreciated, though the former embodiment is directed to the pilot operated pressure control valve assembly, the present embodiment is directed to the direct drive type pressure control valve assembly.

As can be seen from FIG. 2, the shown embodiment of the pressure control valve assembly 71 comprises a valve housing 74 defining therein a valve bore 74a. The valve bore 74a includes a first bore section 74b which has the largest diameter, a second bore section 74d having the smallest diameter, and a third bore section 74c having intermediate diameter between the first and second bore sections and oriented between the first and second bore sections. Annular grooves 76 and 91 are formed on the inner periphery of the bore 74a and open toward the second bore section 22d.

A valve spool 75 is thrustingly disposed within the bore 74a for thrusting movement along the axis thereof. The valve spool 75 has an annular bulge 77 at the end portion opposing the first bore section 74b. The annular bulge 77 is cooperative with the inner periphery of the third bore section 74c for defining therebetween an annular feedback chamber 79. The valve spool 75 defines an annular chamber 87 which extends in circumferential direction on the outer periphery thereof. The annular chamber 87 is in fluid communication with the feedback chamber 79 via an internal path 88 defined through the valve spool 75.

The first bore section 74b opens at one axial end of the valve housing 74. The opening end of the first bore section 74b is closed by an actuator housing 28a which houses an electromagnetic solenoid (not shown) associated with a plunger rod 29. The plunger rod 29 is also biased by means of a bias spring with a predetermined spring force. The actuator housing 28a, the solenoid, the plunger rod 29 and the bias spring forms an actuator assembly 28.

The actuator assembly is cooperative with the first bore section 74b to define a low pressure chamber 78 which opposes the axial end of the valve spool 75. The plunger rod 29 extends through the low pressure chamber 78 to resiliently and constantly contact with the axial end of the valve spool 75. The valve spool 75 also defines a low pressure chamber 81 at the other axial end of the pilot valve spool at the side remote from the low pressure chamber 78. A mechanical spring 80, such as a coil spring, is disposed in the low pressure chamber 81 for exerting spring force toward the actuator. In condition where the solenoid is not energized, the spring force of the mechanical spring 80 and the spring force exerted though the plunger rod 29 balance at a position of the valve spool 75, at which the annular chamber 87 is oriented between the annular grooves 76 and 91 and thus is blocked from fluid communication with either annular groove. This position of the valve spool 75 will be hereafter referred to as "neutral position".

As can be seen from FIG. 2, the low pressure chambers 78 and 81 are connected to the drain port 85 via a drain paths 82 and 83, which drain port 85 is connected to the fluid reservoir 37 via a drain line 92.

A flow restriction orifice 84 is provided between the low pressure chamber 81 and the drain path 82 in order to restrict fluid flow therethrough. Similarly, a flow restriction orifice 84 is provided in the drain path 83 for providing flow restriction for the fluid flow flowing therethrough. The annular chamber 87 is in fluid communication with the working chamber of the hydraulic cylinder via the control port 89 and the control line 90. On the other hand, the annular groove 76 is in fluid communication with the inlet port 73 via a supply path 72.

In the shown construction, the valve spool 75 is directly driven by the solenoid selectively establish fluid communication between the annular chamber 87 and the annular groove 76 and between the annular chamber 87 and the annular groove 91. Therefore, the fluid pressure supplied to the working chamber of the hydraulic cylinder via the fluid pump 36 via the supply line 72, the annular chamber 76, and annular chamber 87, the control port 89 and the control line 90, becomes proportional to the electric current i supplied to the solenoid.

On the other hand, while the fluid pressure in the working chamber is drained, the surge pressure $P_0$ generated by large amount of working fluid flowing through the drain port 85 can be successfully damped by the orifice 84.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. A pressure control valve comprising:
    a valve housing defining a valve bore, an inlet port connected to a pressurized fluid source, a drain port connected to said fluid source for returning working fluid to said fluid source, and a control port connected to a work for controlling the fluid pressure in the work;

a valve spool movable between a first position and a second position across a predetermined neutral position, said valve spool defining with said valve bore a feedback chamber;

means for actuating said valve spool to a selected position corresponding to a desired pressure, said actuating means being located at a first axial end of said valve housing;

a first fluid passage means for establishing fluid communication between said inlet port and said control port for feeding pressurized fluid to said work when said valve spool is in said first position;

a second fluid passage means for establishing fluid communication between said control port and said drain port for draining the fluid pressure in said work when said valve spool is in said second position;

the flow of pressurized fluid between said control port and said inlet and drain ports being halted when said valve spool is in said neutral position;

a flow restriction means associated with said second fluid passage means for damping surge pressure created in said second fluid passage means;

a pilot chamber communicating with said first and second fluid passage means, said pilot chamber being located at a second axial end of said valve housing which is opposed to said first axial end; and said flow restriction means being positioned between said pilot chamber and said drain port.

2. A pressure control valve as set forth in claim 1 wherein said valve spool actuating means comprises an electromagnetic actuator for driving said valve spool between said first and second positions for adjusting fluid pressure in said work.

3. A pressure control valve as set forth in claim 1, wherein said valve spool defines first and second chambers opposing both ends of said valve spool for exerting force on both axial ends of said valve spool for determining the position of said valve spool for force balance therebetween.

4. A pressure control valve comprising:

a valve housing defining a first valve bore, an inlet port connected to a pressurized fluid source, a drain port connected to said fluid source for returning working fluid to said fluid source, and a control port connected to a work for controlling the fluid pressure in the work;

a pilot valve spool movable between a first position and a second position across a predetermined neutral position, said pilot valve spool defining with said first valve bore a feedback chamber;

a first fluid passage means for establishing fluid communication between said inlet port and said control port for feeding pressurized fluid to said work when said pilot valve spool is in said first position;

a second fluid passage means for establishing fluid communication between said control port and said drain port for draining the fluid pressure in said work when said pilot valve spool is in said second position;

a flow restriction means associated with said second fluid passage means for damping surge pressure created in said second fluid passage means;

a pilot chamber communicating with said first and second fluid passage means;

said flow restriction means being positioned between said pilot chamber and said drain port;

said pilot valve spool further defining with said first valve bore first and second low pressure chambers opposing both ends of said pilot valve spool for exerting force on both axial ends of said pilot valve spool for determining the position of said pilot valve spool for force balance therebetween;

said pilot valve spool further defining an annular chamber with said first valve bore; and a secondary valve bore defined in said valve housing, a main valve spool within said secondary valve bore, said main valve spool defining said pilot chamber with said secondary valve bore, said pilot chamber communicating with said annular chamber for establishing a pilot pressure for determining the position of said main valve spool depending upon the force balance between said pilot chamber and a control chamber to which the fluid pressure in the work is introduced.

5. A pressure control valve for controlling fluid pressure in a working chamber of a hydraulic cylinder of an automotive suspension system, comprising:

a valve housing defining a valve bore, an inlet port connected to a pressurized fluid source, a drain port connected to said fluid source for returning working fluid to said fluid source, and a control port connected to a working chamber for controlling the fluid pressure in the working chamber;

a valve spool movable between a first position and a second position across a predetermined neutral position, said valve spool defining with said valve bore a feedback chamber;

means for actuating said valve spool to a selected position corresponding to a desired pressure, said actuating means being located at a first axial end of said valve housing;

a first fluid passage means for establishing fluid communication between said inlet port and said control port for feeding pressurized fluid to said working chamber when said valve spool is in said first position;

a second fluid passage means for establishing fluid communication between said control port and said drain port for draining the fluid pressure in said working chamber when said valve spool is in said second position;

the flow of pressurized fluid between said control port and said inlet and drain ports being halted when said valve spool is in said neutral position;

a flow restriction means associated with said second fluid passage means for damping surge pressure created in said second fluid passage means;

a pilot chamber communicating with said first and second fluid passage means, said pilot chamber being located at a second axial end of said valve housing which is opposed to said first axial end; and said flow restriction means being positioned between said pilot chamber and said drain port.

6. A pressure control valve as set forth in claim 5 wherein said valve spool actuating means comprises an electromagnetic actuator for driving said valve spool between said first and second positions for adjusting fluid pressure in said working chamber.

7. A pressure control valve as set forth in claim 5, wherein said valve spool defines first and second chambers opposing both ends of said valve spool for exerting force on both axial ends of said valve spool for determining the position of said valve spool for force balance therebetween.

8. A pressure control valve for controlling fluid pressure in a working chamber of a hydraulic cylinder of an automotive suspension system comprising:
- a valve housing defining a first valve bore, an inlet port connected to a pressurized fluid source, a drain port connected to said fluid source for returning working fluid to said fluid source, and a control port connected to a work for controlling the fluid pressure in the work;
- a pilot valve spool movable between a first position and a second position across a predetermined neutral position, said pilot valve spool defining with said first valve bore a feedback chamber;
- means for actuating said valve spool to a selected position corresponding to a desired pressure, said actuating means being located at a first axial end of said valve housing;
- a first fluid passage means for establishing fluid communication between said inlet port and said control port for feeding pressurized fluid to said work when said pilot valve spool is in said first position;
- a second fluid passage means for establishing fluid communication between said control port and said drain port for draining the fluid pressure in said work when said pilot valve spool is in said second position;
- a flow restriction means associated with said second fluid passage means for damping surge pressure created in said second fluid passage means;
- a pilot chamber communicating with said first and second fluid passage means, said pilot chamber being located at a second axial end of said valve housing which is opposed to said first axial end;
- said flow restriction means being positioned between said pilot chamber and said drain port;
- said pilot valve spool further defining with said first valve bore first and second low pressure chambers opposing both ends of said pilot valve spool for exerting force on both axial ends of said pilot valve spool for determining the position of said pilot valve spool for force balance therebetween;
- said pilot valve spool further defining an annular chamber with said first valve bore; and
- a secondary valve bore defined in said valve housing, a main valve spool within said secondary valve bore, said main valve spool defining said pilot chamber with said secondary valve bore, said pilot chamber communicating with said annular chamber for establishing a pilot pressure for determining the position of said main valve spool depending upon the force balance between said pilot chamber and a control chamber to which the fluid pressure in the work is introduced.

9. A pressure control valve comprising:
- a valve housing defining a valve bore, an inlet port connected to a pressurized fluid source, a drain port connected to the fluid source for returning working fluid to said fluid source, and a control port connected to a work for controlling the fluid pressure in the work;
- a valve spool movable between a first position and a second position across a predetermined neutral position, said valve spool defining with said valve bore a feedback chamber;
- said valve spool further defining an annular chamber with said valve bore;
- means for actuating said valve spool to a selected position corresponding to a desired pressure, said actuating means being located at a first axial end of said valve housing;
- a first fluid passage means for establishing fluid communication between said inlet port and said control port for feeding pressurized fluid to said work when said valve spool is in said first position;
- a second fluid passage means for establishing fluid communication between said control port and said drain port for draining the fluid pressure in said work when said valve spool is in said second position;
- flow of pressurized fluid between said control port and said inlet and drain ports being halted when said valve spool is in said neutral position;
- a flow restriction means associated with said second fluid passage means for damping surge pressure created in said second fluid passage means;
- a pilot chamber communicating with said annular chamber, said pilot chamber being located at a second axial end of said valve housing opposed to said first axial end;
- said feedback chamber communicating with said first and second fluid passage means; and
- said flow restriction means being positioned between said feedback chamber and said drain port.

10. A pressure control valve according to claim 9 further comprising:
- said flow restriction means being located in a passage extending between said feedback chamber and said drain port and being positioned at an end of said passage adjacent said drain port.

11. A pressure control valve for controlling fluid pressure in a working chamber of a hydraulic cylinder of an automotive suspension system, comprising:
- a valve housing defining a valve bore, an inlet port connected to a pressurized fluid source, a drain port connected to said fluid source for returning working fluid to the fluid source, and a control port connected to a working chamber for controlling the fluid pressure in the working chamber;
- a valve spool movable between a first position and a second position across a predetermined neutral position, said valve spool defining with said valve bore a feedback chamber;
- said valve spool further defining an annular chamber with said valve bore;
- means for actuating said valve spool to a selected position corresponding to a desired pressure, said actuating means being located at a first axial end of said valve housing;
- a first fluid passage means for establishing fluid communication between said inlet port and said control port for feeding pressurized fluid to said working chamber when said valve spool is in said first position;
- a second fluid passage means for establishing fluid communication between said control port and said drain port for draining the fluid pressure in said working chamber when said valve spool is in said second position;
- the flow of pressurized fluid between said control port and said inlet and drain ports being halted when said valve spool is in said neutral position;

a flow restriction means associated with said second fluid passage means for damping surge pressure created in said second fluid passage means;

a pilot chamber communicating with said annular chamber, said pilot chamber being located at a second axial end of said valve housing opposed to said first axial end;

said feedback chamber communicating with said first and second fluid passage means; and said flow restriction means being positioned between said feedback chamber and said drain port.

* * * * *